United States Patent [19]

Freeburg et al.

[11] Patent Number: 4,837,800
[45] Date of Patent: Jun. 6, 1989

[54] CELLULAR DATA TELEPHONE SYSTEM AND CELLULAR DATA TELEPHONE THEREFOR

[75] Inventors: Thomas A. Freeburg, Arlington Heights; Donald F. Dautel, Glendale Heights, both of Ill.

[73] Assignee: Motorola, Inc., Schaumburg, Ill.

[21] Appl. No.: 170,224

[22] Filed: Mar. 18, 1988

[51] Int. Cl.$^4$ ............................................. H01Q 7/04
[52] U.S. Cl. ......................................... 379/59; 379/63; 455/33
[58] Field of Search .................... 379/60, 59, 58, 63; 455/33, 34

[56] References Cited

U.S. PATENT DOCUMENTS

| | | | |
|---|---|---|---|
| 4,155,040 | 5/1979 | Harmon et al. | 455/34 |
| 4,187,398 | 2/1980 | Stark | 379/59 |
| 4,376,310 | 3/1983 | Stackhouse et al. | 378/104 |
| 4,414,661 | 11/1983 | Karlstrom | 379/59 |
| 4,534,061 | 8/1985 | Ulug | 455/17 |
| 4,612,415 | 9/1986 | Zounek | 379/59 |
| 4,654,867 | 3/1987 | Labedz et al. | 379/59 |
| 4,723,264 | 2/1988 | Sasuta et al. | 379/58 |
| 4,730,187 | 3/1988 | Menion et al. | 340/825.5 |
| 4,776,003 | 10/1988 | Harris | 379/91 |

Primary Examiner—Robert Lev
Attorney, Agent, or Firm—Rolland R. Hackbart

[57] ABSTRACT

A unique cellular data telephone system includes a cellular telephone system (CTS 150), a cellular data switch (CDS 170), and a telephone central office (130) for providing both voice and data telephone servies to portable and mobile cellular data telephone (CDTs 102, 122) located anywhere in a large geographical area. Each of the CDTs (102, 122) includes a data control unit (DCU 106), a cellular modem (162) and a cellular telephone (108) and associated antenna (110), and connects to a data terminal (104, 124) with keyboard and display. DCU (106) includes memory (302) for storing a CDS telephone number and CDT telephone number, microcomputer (304) with internal memory for controlling data communications between cellular modem (162) and data terminal (104), a dual tone multifrequency ("DTMF") encoder (306) for encoding telephone numbers and control signals, a DTMF decoder (314) for decoding DTMF telephone digits and/or DTMF control tones, a buffer (312) for storing transmit data from data terminal (104), and analog switches (308, 310) for coupling DTMF encoder (306) and buffer (312) to the transmit data Td signal to cellular modem (162). If data terminal (104) is inactive for a predetermined time interval, DCU (106) automatically disconnects the cellular telephone call while maintaining the landline telephone call to a data host (140, 141). Once data is transmitted again by data terminal (104), DCU (106) automatically places another cellular telephone call and is reconnected to the landline telephone call.

13 Claims, 5 Drawing Sheets

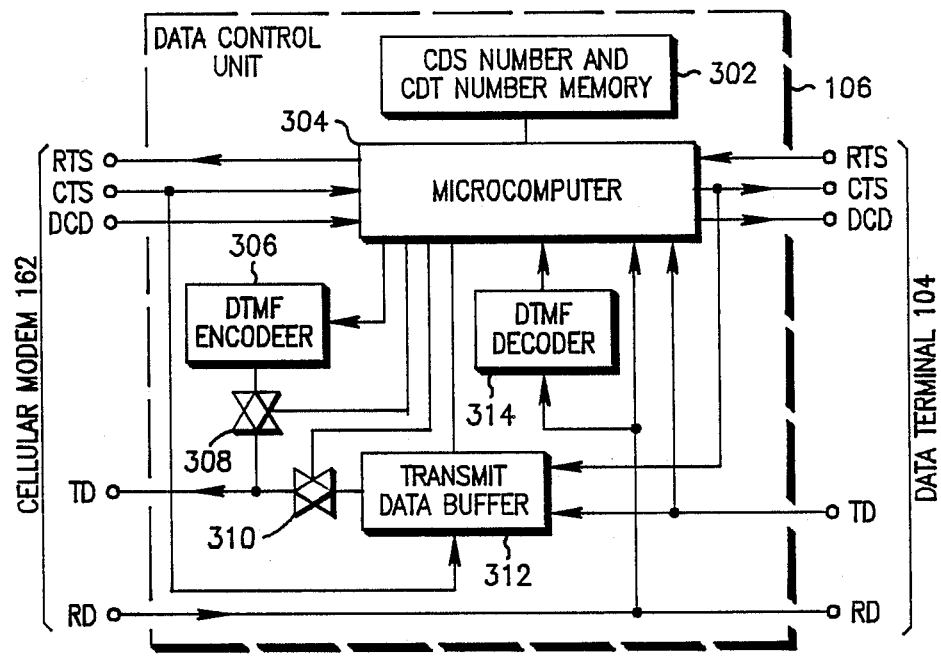
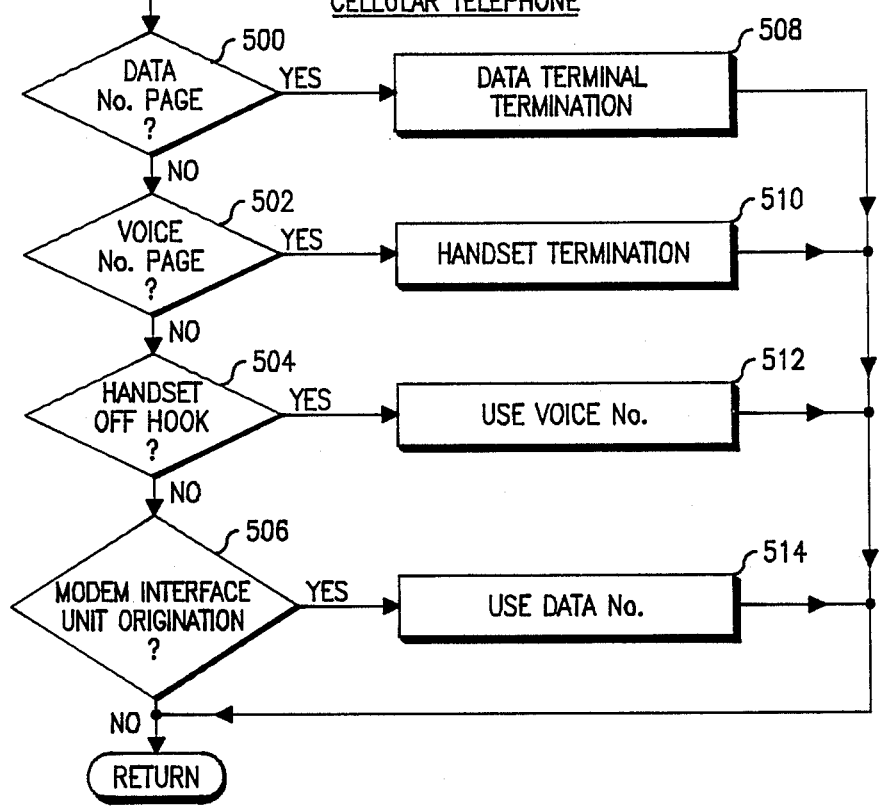
FIG. 4
FIG. 5

DATA TERMINAL

CELLULAR DATA TELEPHONE SYSTEM AND CELLULAR DATA TELEPHONE THEREFOR

BACKGROUND OF THE INVENTION

The present invention is generally related to cellular telephone systems and more particularly to an improved cellular data telephone system and cellular data telephone for providing data and telephone services.

In the prior art cellular telephone systems, telephone calls between two parties continue until their discussions are completed. Since both parties are continuously listening, either can ascertain that the discussions have been terminated and hang up. However, when making data calls on cellular telephone systems, the user is not continuously listening and, as a result, there may be long periods of time when there is no data activity. Since the user is billed for the actual air time used, the user is being charged at a relatively high rate for such long periods of inactivity. Furthermore, the cellular telephone system is needlessly tied up with data calls that could be disconnected during the long periods of inactivity. Accordingly, there is a need for an improved cellular data telephone system and cellular data telephone that maintain data calls only as necessary to communicate data, thereby substantially eliminating long periods of inactivity.

SUMMARY OF THE INVENTION

Accordingly, it is an object of the present invention to provide an improved cellular data telephone system and cellular data telephone that maintains data calls only as necessary to communicate data, thereby substantially eliminating long periods of inactivity.

It is another object of the present invention to provide an improved cellular data telephone system and cellular data telephone that are responsive to lack of data activity for disconnecting a cellular telephone call and maintaining the landline telephone call, and that are responsive to subsequently occurring data activity for making another cellular telephone call and reconnecting the landline telephone call thereto.

BRIEF DESCRIPTION OF THE DRAWINGS

FIG. 4 is a block diagram of the data control unit in the cellular data telephone 102 in FIG. 1.

FIG. 5 is a flow chart for the process used by the cellular telephone 108 in FIGS. 1 and 2 for controlling voice and data calls.

DESCRIPTION OF THE PREFERRED EMBODIMENT

Figure 1:
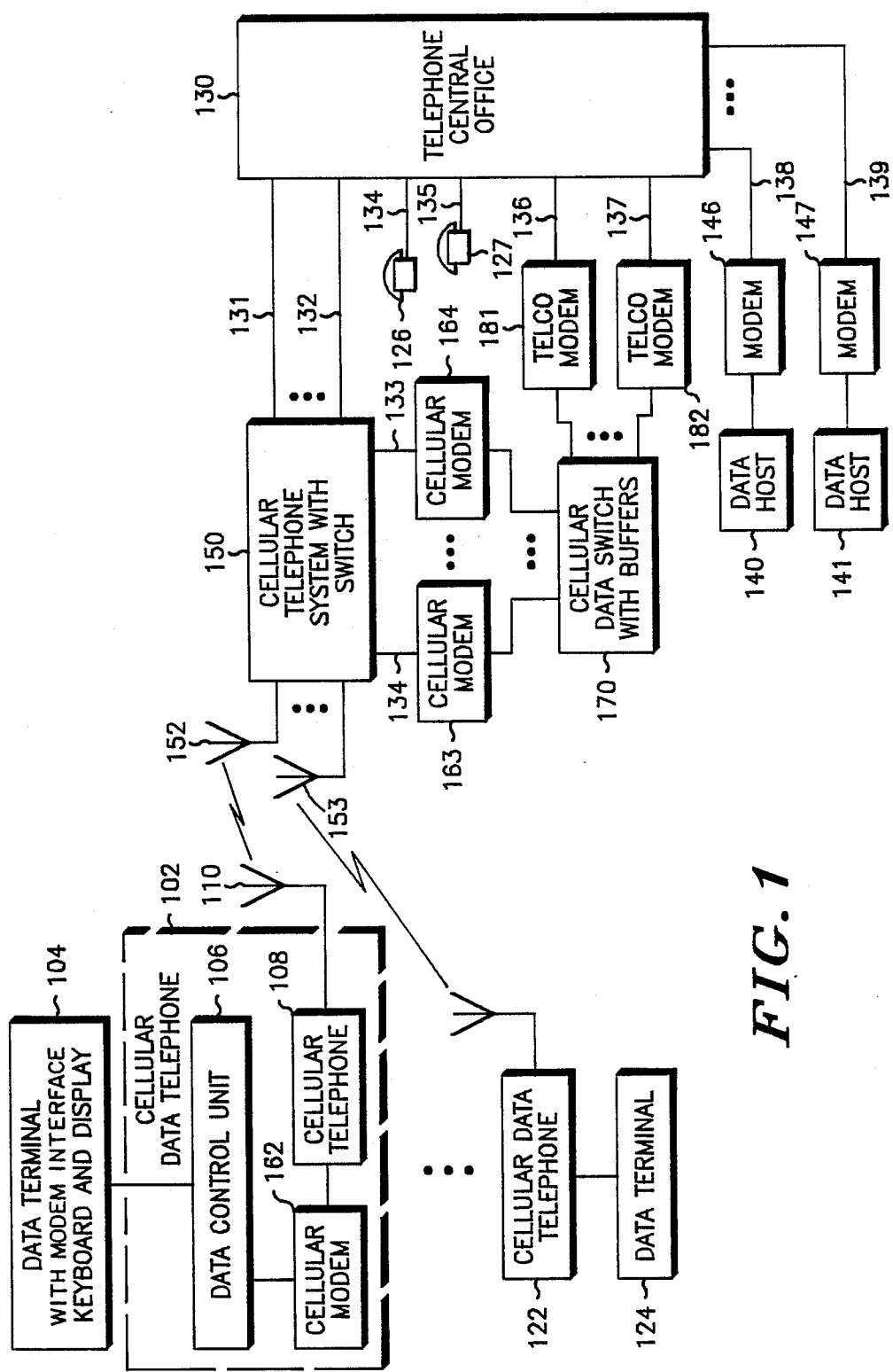
FIG. 1 is a block diagram of a cellular data telephone system that may advantageously utilize the present invention.

In FIG. 1, there is illustrated a cellular data telephone system for providing both voice and data telephone services to portable and mobile cellular data telephones (CDTs) 102, 122 located anywhere in a large geographical area. A cellular telephone system (CTS) 150 including antennas 152, 153 located at corresponding base sites throughout the geographical area is coupled to telephone central office 130 for providing cellular telephone services to CDTs 102, 122. CTS 150 may be any commercially available cellular telephone system such that described in U.S. Pat. Nos. 3,906,166 and 4,268,722. Cellular data switch (CDS) 170 is coupled by cellular modems 163, 164 to CTS 150 and by telco modems 181, 182 to telephone central office 130 for providing data services to CDTs 102, 122. Telephone central office 130 is a conventional landline switching system that is coupled by telephone trunks 131, 132 to CTS 150; telephone lines 134, 135 to landline telephones 126, 127; by telephone lines 136, 137 to telco modems 181, 182; and by telephone lines 138, 139 to modems 146, 147. Telephone central office 130 may also be interconnected to other conventional telephone equipment and systems.

Each of the CDTs 102, 122 includes a data control unit 106, a cellular modem 162 and a cellular telephone 108 and associated antenna 110, and connects to a data terminal/personal computer 104, 124 with a keyboard and display. Data terminal 104 may be, for instance, any commercially available portable personal computer including a modem interface, keyboard and display. Cellular modem 162 may be any commercially available modem which includes error correcting capacity for accommodating a noisy and sometimes interrupted environment, such as that encountered in cellular telephone systems. For example, cellular modem 162 may be a modem such as that described in U.S. Pat. No. 4,697,281, or a commercially available modem referred to as the "BRIDGE" which is manufactured and sold by Spectrum Cellular Communications Corporation, Inc., Dallas, Tex.

Figure 2:
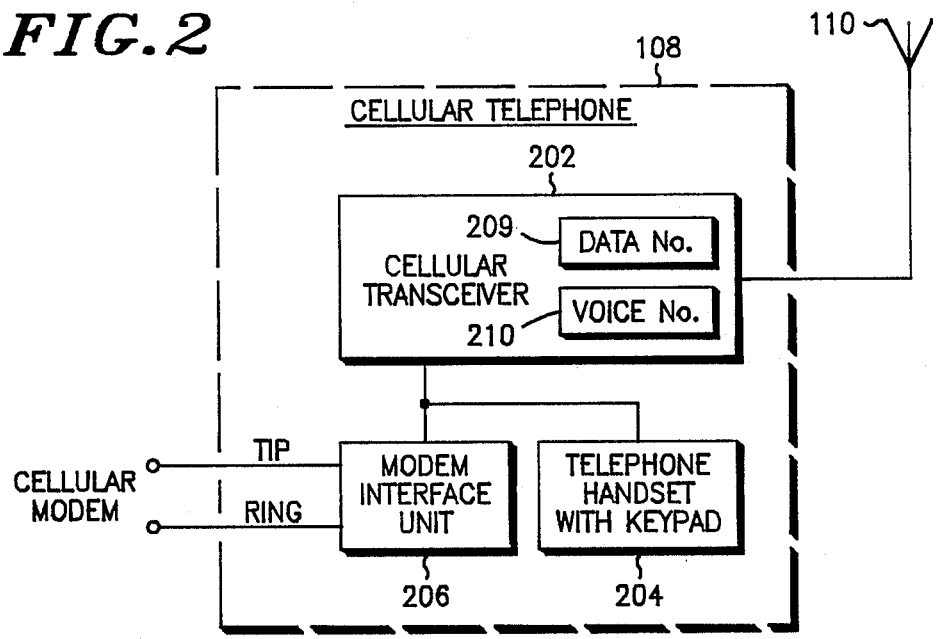
FIG. 2 is a block diagram of the cellular telephone in the cellular data telephone 102 in FIG. 1.

Referring next to FIG. 2, there is illustrated in more detail cellular telephone 108 in FIG. 1. Cellular telephone 108 may include a conventional cellular transceiver 202, telephone handset with keypad 204 and modem interface unit 206. Cellular transceiver 202 typically accommodates multiple telephone numbers, and in the preferred environment, may be assigned a data telephone number 209 and a voice telephone number 210. The data telephone number 209 is associated with modem interface unit 206, while the voice telephone number 210 is associated with telephone handset 204. When data telephone number 209 is called, the call is directed by cellular transceiver 202 to modem interface unit 206. Similarly, when voice telephone number 209 is called, the call is directed by cellular transceiver 202 to telephone handset 204. Cellular telephone 108 may be any commercially available cellular telephone that includes a modem interface unit 206. For example, cellular telephone 108 may be a "DYNATAC" Cellular Mobile Telephone which is commercially available from Motorola, Inc. and described in detail in Motorola Instruction Manual 68P81070E40, together with an intelligent RJ11C interface identified as "THE CELLULAR CONNECTION" which is commercially available from Motorola, Inc. and described in further detail in Motorola Instruction Manual 68P81071E30. Copies of the foregoing Motorola Instruction Manuals may be obtained from Motorola C&E Parts, 1313 East Algonquin Road, Schaumburg, Ill. 60196, U.S.A.

Referring to FIG. 4, there is illustrated in more detail data control unit (DCU) 106 in FIG. 1. DCU 106 includes memory 302 for storing a CDS telephone number and CDT telephone number, microcomputer 304 with internal memory for controlling data communications between cellular modem 162 and data terminal 104 in FIG. 1, a dual-tone-multifrequency ("DTMF") encoder 306 for encoding telephone numbers and control signals, a DTMF decoder 314 for decoding DTMF telephone digits and/or DTMF control tones, a buffer 312 for storing transmit data from data terminal 104 in FIG. 1, and analog switches 308 and 310 for coupling DTMF encoder 306 and buffer 312 to the transmit data Td signal to cellular modem 162 in FIG. 1.

DCU 106 interfaces to the control signals RTS, CTS and DCS and the data signals Rd and Td coupled to cellular modem 162 and data terminal 104. The control signals RTS, CTS and DCS and the data signals Rd and Td are conventional interface signals for commercially available modems. That is, when initiating a modem connection to data host 140, data terminal 104 sets the request to send signal RTS=1. Assuming the data terminal 104 is connected directly to cellular modem 162, cellular modem 162 then sets the clear to send signal CTS=1. Thereafter, data terminal 104 may apply data to the transmit data signal Td, coded according to the format accepted by cellular modem 162. The data may include a landline telephone number of a desired data host 140, which is automatically dialed by the cellular modem 162. Assuming CDS 170 is not present, CTS 150 connects cellular modem 162 to the desired data host 140 via telephone central office 130. When the cellular modem 162 detects carrier from the modem 146 at the desired data host 140, the cellular modem 162 sets the data carrier detected signal DCD=1. If at any time carrier from the modem 146 is lost, the cellular modem 162 sets the data carrier detected signal DCD=0. All other modems 163, 164, 181, 182, 146 and 147 have the same control and data lines and operate in a similar manner to that described hereinabove for cellular modem 162.

According to the present invention, DCU 106 is interposed between data terminal 104 and cellular modem 162 for controlling the cellular telephone call to CTS 150 and the landline telephone call to data host 140, 141. If data terminal 104 is inactive for a predetermined time interval, DCU 106 automatically disconnects the cellular telephone call, while CDS 170 maintains the landline telephone call. Once data is transmitted again by data terminal 104, DCU 106 automatically places another cellular telephone call and is reconnected to CDS 170 and the landline telephone call via one of the cellular modems 163, 164.

DTMF encoder 306 and DTMF decoder 314 in DCU 106 are utilized by microcomputer 304 to encode and decode, respectively, DTMF control tones and telephone numbers. In the preferred embodiment of DCU 106, a DTMF control tone is used for RF disconnect of the cellular telephone call, and another DTMF control tone is used for call disconnect of both the cellular telephone call and the landline telephone call. The RF disconnect tone and the call disconnect tone are applied to the Td signal by enabling analog switch 308 and disabling analog switch 310. An RF disconnect tone or call disconnect tone from CDS 170 ar detected by DTMF decoder 314 which is coupled to the Rd signal from cellular modem 162.

Microcomputer 304 receives the RTS signal from data terminal 104 and generates the RTS signal to cellular modem 162, and likewise receives the CTS and DCD signals for cellular modem 162 and generates the CTS and DCD signals to data terminal 104 for placing and controlling the cellular telephone call and landline telephone call between data terminal 104 and a desired data host 140, 141. The Rd signal from cellular modem 162 is coupled to the Rd signal to data terminal 104, while the Td signal from data terminal 104 is coupled to buffer 312, whose output is coupled via analog switch 310 to the Td signal to cellular modem 162.

A call is initiated by data terminal 104 by setting RTS=1. Microcomputer 304 detects RTS=1 from data terminal 104 and sets RTS=1 to the cellular modem 162. In response to RTS=1, the cellular modem 162 sets CTS=1 and prepares to place a cellular telephone call. Microcomputer 304 detects CTS=1 from the cellular modem 162, reads the CDS and CDT telephone numbers from memory 302, and applies the CDS telephone number to the Td signal to cellular modem 306 via DTMF encoder 306 and analog switch 308. Analog switch 310 is off at this point in time. When cellular modem 162 detects carrier from cellular modem 163, cellular modem 162 sets DCD=1. Microcomputer 304 detects DCD=1 from the cellular modem 162 and applies the CDT telephone number to the Td signal to cellular modem 306 via DTMF encoder 306 and analog switch 308.

Next, Microcomputer 304 sets CTS=1 and DCD=1 to data terminal 104, turns off analog switch 308, and turns on analog switch 310. When CTS=1 from the cellular modem 162 and CTS=1 from microcomputer 304, buffer 312 is enabled to apply data to its output. When CTS=1 from microcomputer 304, data terminal 104 can manually or automatically dial the landline telephone number of the desired data host, e.g. 141. CDT 102 is switched to a telco modem 136, 137 by CDS 170, and telephone central office 130 receives the dialed landline telephone number of host 141 and switches in modem 147 and corresponding data host 141, thereby completing the landline telephone call. At this point, both the cellular telephone call and the landline telephone call are connected. The landline telephone call continues until CDT 102 or data host 141 hangs up, while the cellular telephone call may be disconnected and reconnected depending upon data activity from data terminal 104. If data host 141 hangs up, CDS 170 sends a call disconnect tone to DCU 106. If data terminal sets RTS=0, DCU 106 sends a call disconnect tone to CDS 170. If data terminal 104 is inactive for a predetermined period of time, DCU 106 sends an RF disconnect tone to CSD 170 and disconnects the cellular telephone call. When buffer 312 is full, DCU 106 makes another cellular telephone call and is reconnected by CDS 170 to data host 141. A detailed description of the call processing by DCU 106 is provided hereinbelow with respect to FIG. 6.

Figure 3:
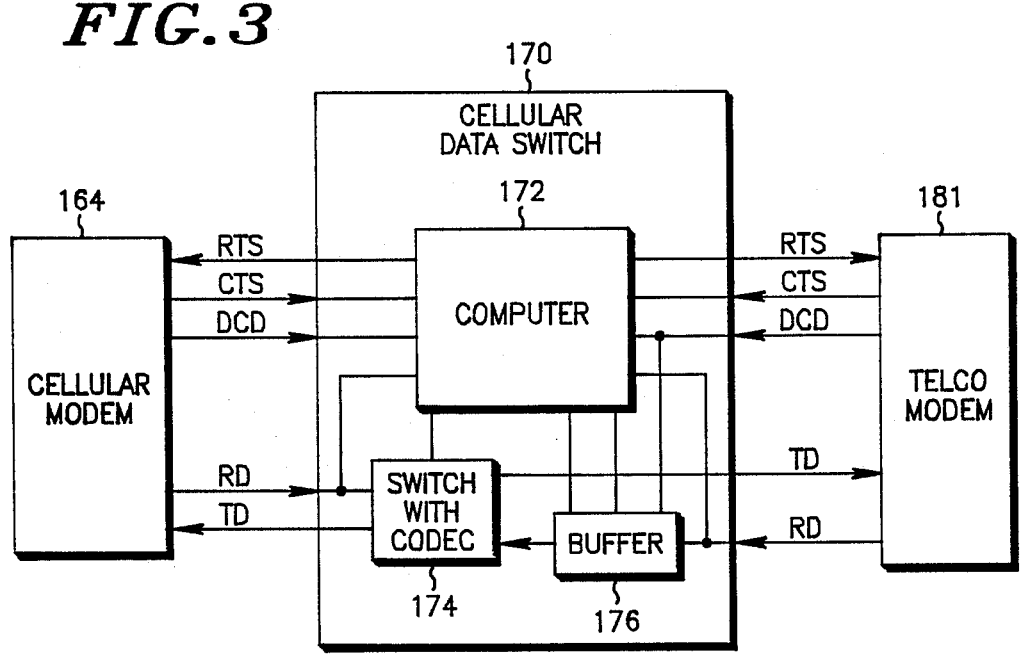
FIG. 3 is a block diagram of the cellular data switch 170 in FIG. 1.

Referring to FIG. 3, there is illustrated in more detail cellular data switch (CDS) 170 in FIG. 1. CDS 170 includes a computer 172 for controlling cellular modems 163, 164 and telco modems 181, 182; switch 174 with DTMF codec for intercoupling cellular modems 163, 164 and telco modems 181, 182; and buffers 176 for each telco modem 181, 182. Cellular modems 163, 164 are similar to cellular modem 162 in CDT 102, while modems 181, 182 may be any conventional telephone modem. Switch 174 may of course be implemented with either circuit-switched or packet-switched techniques. Buffer 176 stores data from the Rd signal of telco modem 181 when the cellular telephone call has been disconnected and the landline telephone call is being maintained. CDS 170 may be any suitable commercially available data switch, such as, for example, the data switches manufactured and sold by Tandem Computers, Inc., 19333 Vallco Parkway, Cupertino, Calif., 95014, U.S.A.

Computer 172 of CDS 170 detects an incoming call from cellular modem 164 or telco modem 181 when either sets DCD=1. Assuming cellular modem 164 is the initiating modem, computer 172 sets RTS=1 and monitors the Rd signal to receive the CDT telephone number. If the received CDT telephone number corresponds to that for a call in progress, computer 172 reconnects cellular modem 164 to the corresponding telco modem 181, 182. Otherwise, computer 172 connects cellular modem 164 to one of the telco modems 181, 182 not in use. If telco modem 181 is the initiating modem, computer 172 sets RTS=1 and connects telco modem 181 to one of the cellular modems 163, 164 not in use. A detailed description of the call processing by CDS 170 is provided hereinbelow with respect to FIG. 7.

Referring to FIG. 5, there is illustrated a flow chart for the process used by the cellular telephone 108 in FIGS. 1 and 2 for controlling voice and data calls. Cellular transceiver 202 is assigned two telephone numbers, a data telephone number 209 for modem interface unit 206 and a voice telephone number 210 for handset 204. However, only one telephone number need be used in practicing the present invention. For example, upon receipt of a telephone call from CDS 170, the user, upon hearing the modem carrier signal, may manually switch out handset 204 and switch in modem interface unit 206.

Entering at the START block in FIG. 5 and proceeding to decision block 500, a check is made to determine if a data telephone number page has been received. If so, YES branch is taken to block 508 where the incoming call is terminated to modem interface unit 206. If not, NO branch is taken from decision block 500 to decision block 502. At decision block 502, a check is made to determine if a voice telephone number page has been received. If so, YES branch is taken to block 510 where the incoming call is terminated to handset 204. If not, NO branch is taken from decision block 502 to decision block 504.

At decision block 504, a check is made to determine if handset 204 has been taken off hook to initiate a voice call. If so, YES branch is taken to block 512 where the outgoing call is originated with voice telephone number 210. If not, NO branch is taken from decision block 504 to decision block 506. At decision block 506, a check is made to determine if modem interface unit 206 has originated a data call. If so, YES branch is taken to block 514 where the outgoing call is originated with data telephone number 209. If not, NO branch is taken from decision block 506 to the RETURN block to return to other tasks.

Figure 6:
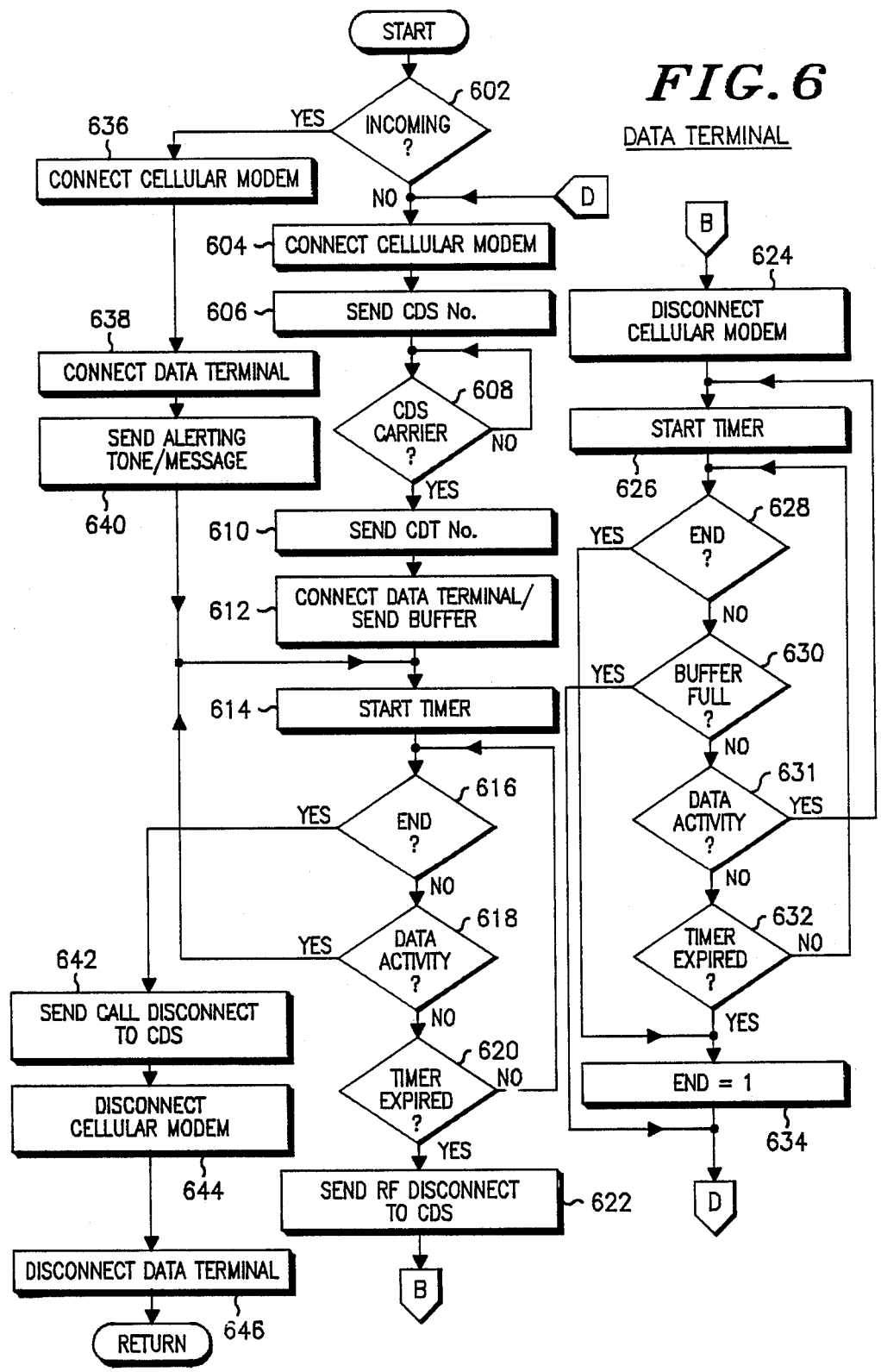
FIG. 6 is a flow chart for the process used by the data control unit in FIG. 4 for controlling a data call.

Referring to FIG. 6, there is illustrated a flow chart for the process used by microcomputer 304 of DCU 106 in FIG. 4 for controlling a data call. Entering at the START block in FIG. 6 and proceeding to decision block 602, a check is made to determine if an incoming call is being processed. If not, NO branch is taken to block 604 where cellular modem 162 is connected. Next, at block 606, the CDS telephone number is sent. Then, at decision block 608, a check is made to determine if a modem carrier signal has been received from CDS 170. If not, NO branch is taken to wait a predetermined time interval for a modem carrier signal. If a modem carrier signal is not received in the predetermined time interval, DCU 106 returns to other tasks. If a modem carrier signal is received, YES branch is taken from decision block 608 to block 610, where the CDT telephone number from memory 302 is sent. Next, at block 612, data terminal 104 is connected and the data, if any, in buffer 312 is sent.

At block 614, the data call is connected and a data timer is started. At this point, data terminal 104 may dial the landline telephone number of the desired data host, e.g. 141. During periods of data inactivity from data terminal 104, the data timer counts down over a predetermined time interval until expired. Next, at decision block 618, a check is made to determine if the data call should end. A data call may end by receipt of a call disconnect signal from CDS 170, or by data terminal 106 setting RTS=0, of if the variable END is set to one. If the call is to end, YES branch is taken from decision block 616 to block 642, where a call disconnect signal is sent to CDS 170. Next, cellular modem 162 is disconnected at block 644. Then, at block 646, data terminal 104 is disconnected and microcomputer 304 returns to other tasks at the RETURN block.

If the call is to continue, NO branch is taken from decision block 616 to decision block 618, where a check is made to determine if there has been any data activity from data terminal 104. Microcomputer 304 is coupled to the Td signal from data terminal 104 for checking for data activity. If data is being transmitted by data terminal 104, YES branch is taken back to block 614 to restart the data timer and repeat blocks 614, 616 and 618. If data is not being transmitted by data terminal 104, NO branch is taken from decision block 618 to decision block 620, where a check if made to determine if the data timer has expired. If not, NO branch is taken back to decision block 616.

Returning to decision block 602, if data terminal 104 is receiving a data call, YES branch is taken to block 636 where cellular modem 162 is connected. Next, data terminal 104 is connected at block 638. Then, at block 640, an alerting signal, such as an audible tone or a message in the data terminal display or both, is generated to advise the user that a data call has been received. Data terminal 104 may answer the incoming data call by either automatically setting RTS=1, or by setting RTS=1 in response to data entered by the user. Next, at block 614, program control proceeds as described hereinabove.

Returning to decision block 620, if the data timer has expired, YES branch is taken to block 622 where an RF disconnect is sent to CDS 170 for disconnecting the cellular telephone call and maintaining the landline telephone call. According to an important feature of the present invention, the cellular telephone call is maintained only as necessary for data communications. When data terminal 104 has not transmitted data for a predetermined time interval determined by the data timer, the cellular telephone call is automatically disconnected by microcomputer 304.

Next, at block 624, cellular modem 162 is disconnected. Then, a reconnect timer is started at block 626. During the time period when the cellular telephone call is disconnected, the reconnect timer counts down over a predetermined time interval until expired. The landline telephone call is maintained at least for the predetermined time interval of the reconnect timer. Once the reconnect timer has expired, the landline telephone call is disconnected. Next, at decision block 628, a check is made to determine if the data call should end. If the call is to end, YES branch is taken from decision block 628 to block 634, where the variable END is set to one and program control returns to block 604 to disconnect the data call.

If the call is to continue, NO branch is taken from decision block 628 to decision block 630, where a check is made to determine if buffer 312 is full. If buffer 312 is full, YES branch is taken back to block 604 to reconnect the data call. If buffer 312 is not full, NO branch is taken from decision block 630 to decision block 631, where a check is made to determine if there has been any data activity from data terminal 104. If data is being transmitted by data terminal 104, YES branch is taken back to block 626 to restart the reconnect timer. If data terminal 104 is not transmitting data, No branch is taken from decision block 631 to decision block 632, where a check is made to determine if the reconnect timer has expired. If not, NO branch is taken back to decision block 628. If the reconnect timer has expired, YES branch is taken from decision block 632 to block 634. At block 634, the variable END is set equal to one and program control returns to block 604 to disconnect the data call.

Upon returning to block 604 from either block 630 or 634, according to the present invention, another cellular telephone call is made to CDS 170. If END=1, both the cellular telephone call and landline telephone call are disconnected. If END=0, data terminal 104 is reconnected and the data in buffer 312 is transmitted to CDS 170. Similarly, the data in buffer 176 in CDS 170 is transmitted to data terminal 104 when data host 141 is reconnected. Thereafter, data communications take place as described hereinabove with respect to blocks 616, 618 and 620.

Figure 7:
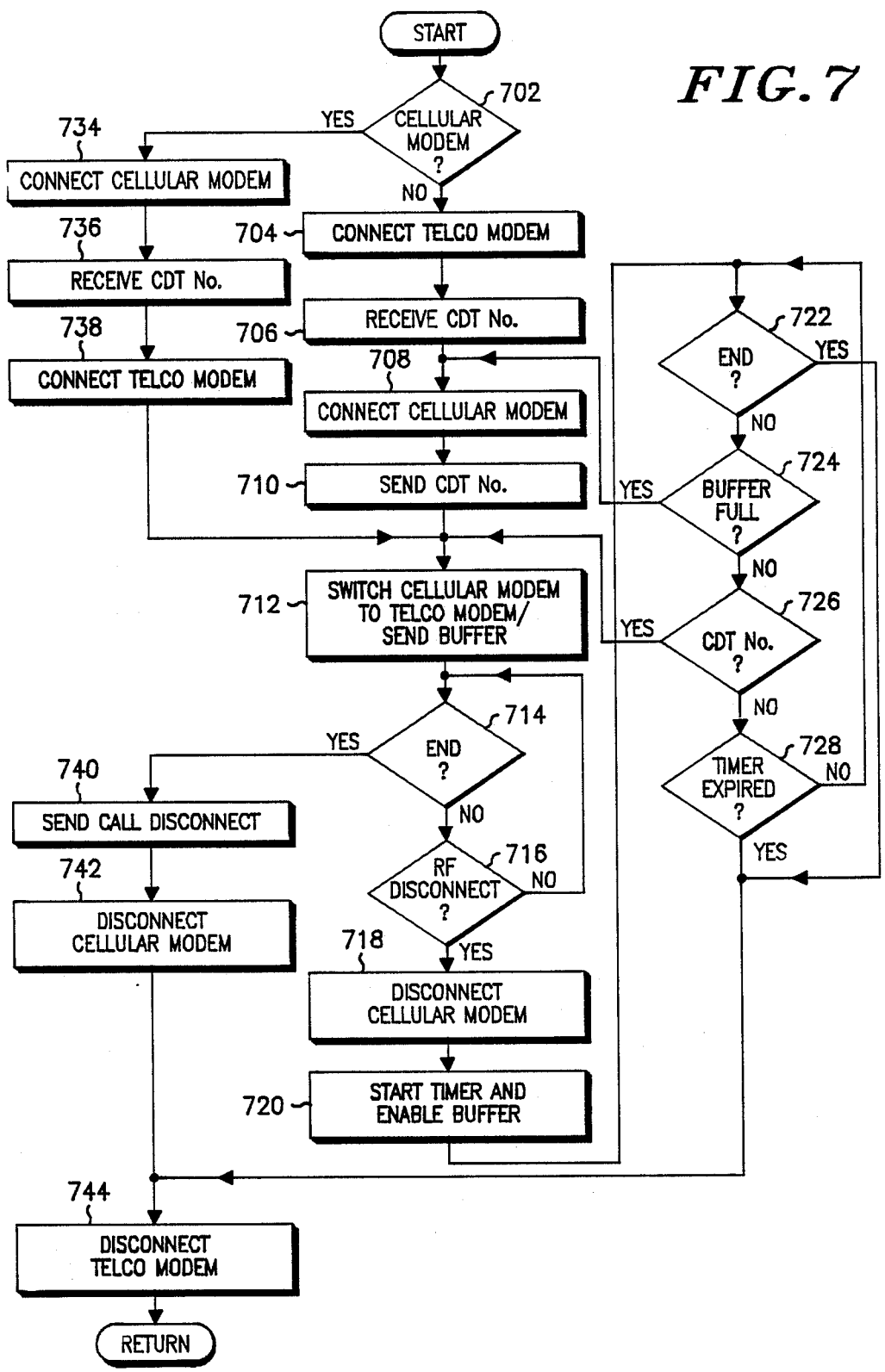
FIG. 7 is a flow chart for the process used by the cellular data switch 170 in FIGS. 1 and 3 for controlling a data call.

Referring to FIG. 7, there is illustrated a flow chart for the process used by the CDS 170 in FIGS. 1 and 3 for controlling a data call. Entering at the START block in FIG. 7 and proceeding to decision block 702, a check is made to determine if a data call has been initiated by a cellular modem 163, 164. If not, NO branch is taken to block 704 where the initiating telco modem, e.g. 181, is connected. Next, at block 706, the CDT telephone number is received. Then, a non-busy cellular modem, e.g. 164, is connected at block 708. Next, at block 710, the CDT telephone number is sent to CTS 150. CTS 150 uses the received CDT telephone number to page the desired CDT 102, 122.

Returning to decision block 702, if a cellular modem, e.g. 164, has initiated the data call, YES branch is taken to block 734 where the initiating cellular modem 164 is connected. Next, the CDT telephone number is received at block 736. Then, at block 738, a non-busy telco modem, e.g. 181, is connected if the CDT telephone number is not associated with a call in process. If the CDT telephone number is associated with a data call in process to a telco modem, e.g. 181, a non-busy telco modem, e.g. 182, is not connected.

From blocks 710 and 738, program control proceeds to block 712, where cellular modem 164 and telco modem 181 are interconnected by switch 174 and data, if any, in buffer 176 is transmitted. Next, at decision block 714, a check is made to determine if the data call should end. A data call may end by receipt of a call disconnect signal from CDT 104, or by telco modem 181 setting RTS=0. If the call is to end, YES branch is taken from decision block 714 to block 740, where a call disconnect signal is sent to CDT 104. Next, cellular modem 164 is disconnected at block 742. Then, at block 744, telco modem 181 is disconnected and computer 172 returns to other tasks at the RETURN block.

If the call is to continue, NO branch is taken from decision block 714 to decision block 716, where a check is made to determine if an RF disconnect signal has been received. If not, NO branch is taken to return to decision block 714. If an RF disconnect signal has been received, YES branch is taken from decision block 716 to block 718, where cellular modem 164 is disconnected. Next, at block 720, buffer 176 is enabled and a reconnect timer is started. During the time period when the cellular telephone call is disconnected, the reconnect timer counts down over a predetermined time interval until expired. The time interval of the reconnect timer in CDS 170 is preferably set to be greater than the time interval of the reconnect timer in DCU 106. In the preferred embodiment, the time interval of the reconnect timer in CDS 170 is two minutes, and the time interval of the reconnect timer in DCU 106 is one minute. The landline telephone call is maintained by CDS 170 at least for the predetermined time interval of the reconnect timer. Once the reconnect timer has expired, the landline telephone call is disconnected. Next, at decision block 722, a check is made to determine if the data call should end. If the data call is to end, YES branch is taken from decision block 722 to block 744, where the telco modem 181 is disconnected, and program control returns to other tasks at the RETURN block.

If the data call is to continue, NO branch is taken from decision block 722 to decision block 724, where a check is made to determine if buffer 176 is full. If so, YES branch is taken to block 708 to reconnect the data call. If buffer 176 is not full, NO branch is taken from decision block 724 to decision block 726, where a check is made to determine if there the CDT telephone number has been received for reconnecting data terminal 104. If so, YES branch is taken back to block 712 to reconnect telco modem 181 to the cellular modem 163, 164 that received the CDT telephone number. If the CDT telephone number has not been received, No branch is taken from decision block 726 to decision block 728, where a check is made to determine if the reconnect timer has expired. If not, NO branch is taken back to decision block 722. If the reconnect timer has expired, YES branch is taken from decision block 632 to block 744 to disconnect the data call, as described hereinabove.

Upon returning to block 708 from block 724, according to the present invention, another cellular telephone call is made to data terminal 104. Data terminal 104 is reconnected and the data in buffer 176 is transmitted to data terminal 104. Similarly, the data in buffer 312 in DCU 106 is transmitted to CDS 170. Thereafter, data communications take place as described hereinabove with respect to blocks 714 and 716.

The flow charts in FIGS. 5, 6 and 7 provide a detailed description of the process steps executed by the corresponding computing circuitry of the cellular telephone 108, DCU 106 and CDS 170, respectively. By way of analogy to an electrical circuit diagram, the flow charts in FIGS. 5, 6 and 7 are equivalent to a detailed schematic of an electrical circuit where provision of the part values for electrical circuit components in the electrical schematic corresponds to provision of computer instructions for blocks of the flow charts. Thus, the coding of the process steps of these flow charts into instructions of suitable commercially available computers is a mere mechanical step for a routineer skilled in the programming art.

In summary, a unique cellular data telephone system and cellular data telephone are responsive to lack of activity for disconnecting a cellular telephone call and maintaining a landline telephone call to a data host, and are responsive to subsequently occurring activity for making another cellular telephone call and reconnecting the landline telephone call thereto. The cellular data telephone of the present invention may be advantageously utilized in any cellular telephone system where data services are desired. Therefore, while a particular embodiment of our invention has been shown and described, it should be understood that our invention is not limited thereto since other embodiments may be made by those skilled in the art without departing from the true spirit and scope of our invention. It is thus contemplated that our patent encompasses any and all such embodiments covered by the following claims.

We claim:

1. A cellular data telephone system for communicating data with a data host, comprising:
   a cellular telephone system having a plurality of radio channels for cellular telephone calls;
   a landline telephone system having a plurality of telephone lines for switching a landline telephone call to a data host;
   a cellular data switch having a plurality of telephone lines coupled to the cellular telephone system and landline telephone system for switching a cellular telephone call to the landline telephone system, said cellular data switch maintaining and reswitching a cellular telephone to a switched telephone line to the landline telephone system until disconnected by the cellular telephone;
   a cellular telephone having a predetermined telephone number for originating and receiving cellular telephone calls on the cellular telephone system;
   a cellular modem coupled to the cellular telephone for communicating data therebetween;
   a data terminal for transceiving data, said data terminal producing a call origination signal having a first state when a landline telephone call to the data host is originated and a second state when the landline telephone call is disconnected; and
   data control means coupled between said data terminal and said cellular modem for coupling data therebetween, said data control means responsive to the first state of the call origination signal for placing and disconnecting cellular telephone calls to the cellular data switch depending on the data activity of the data terminal, and said data control means responsive to the second state of the call origination signal for disconnecting the cellular telephone call and the landline telephone call.

2. The cellular data telephone system according to claim 1, wherein said data control means includes buffer means for storing data from said data terminal when a cellular telephone call is disconnected and the landline telephone call is being maintained.

3. The cellular data telephone system according to claim 1, wherein said cellular data switch includes buffer means for storing data from said selected data host when a cellular telephone call is disconnected and the landline telephone call is being maintained.

4. A cellular data telephone system for communicating data with a data host, comprising:
   a cellular telephone system having a plurality of radio channels for cellular telephone calls;
   a landline telephone system having a plurality of telephone lines for switching a landline telephone call to a data host;
   a cellular data switch having a plurality of telephone lines coupled to the cellular telephone system and landline telephone system for switching a cellular telephone call to the landline telephone system, said cellular data switch maintaining and reswitching a cellular telephone to a switched telephone line to the landline telephone system until disconnected by the cellular telephone;
   a cellular telephone having a predetermined telephone number for originating and receiving cellular telephone calls on the cellular telephone system;
   a cellular modem coupled to the cellular telephone for communicating data therebetween;
   a data terminal for transceiving data, said data terminal producing a call origination signal having a first state when a landline telephone call to the data host is originated and a second state when the landline telephone call is disconnected; and
   data control means coupled between said data terminal and said cellular modem for coupling data therebetween, said data control means including:
   buffer means for storing data from the data terminal and producing an output signal when said buffer means is full; and
   processing means for placing a cellular telephone call to the cellular data switch in response to the first state of the call origination signal, for disconnecting the cellular telephone call when data has not been received from the data terminal for a predetermined time interval, for placing another cellular telephone call to the cellular data switch in response to the buffer means output signal, and for disconnecting the cellular telephone call and the landline telephone call in response to the second state of the call origination signal.

5. The cellular data telephone system according to claim 4, wherein said cellular data switch includes buffer means for storing data from said selected data host when a cellular telephone call is disconnected and the landline telephone call is being maintained.

6. A cellular data telephone for communicating data with a data host, said cellular data telephone coupled to the data host by means of a cellular telephone system, a cellular data switch and a landline telephone system, said cellular data switch having a plurality of telephone lines coupled to the cellular telephone system and landline telephone system for switching a cellular telephone call to the landline telephone system, and said cellular data switch maintaining and reswitching a cellular data telephone to a switched telephone line to the landline telephone system until disconnected by the cellular data telephone, said cellular data telephone comprising:
   a cellular telephone having a predetermined telephone number for originating and receiving cellular telephone calls on the cellular telephone system;
   a data terminal for transceiving data, said data terminal producing a call origination signal having a first state when a landline telephone call to the data host is originated and a second state when the landline telephone call is disconnected;
   data control means coupled between said data terminal and said cellular telephone for coupling data therebetween, said data control means including:

buffer means for storing data from the data terminal and producing an output signal when said buffer means is full; and processing means for placing a cellular telephone call to the cellular data switch in response to the first state of the call origination signal, for disconnecting the cellular telephone call when data has not been received from the data terminal for a predetermined time interval, for placing another cellular telephone call to the cellular data switch in response to the buffer means output signal, and for disconnecting tee cellular telephone call and the landline telephone call in response to the second state of the call origination signal.

7. The cellular data telephone according to claim 6, wherein said data control means further includes means for encoding an RF disconnect signal when entered data has not been received for the predetermined time interval and coupling said RF disconnect signal to said cellular telephone for transmission.

8. The cellular data telephone according to claim 6, wherein said data control means further includes means for storing the predetermined telephone number of said cellular telephone, said processing means coupling the stored predetermined telephone number to said cellular telephone for transmission when a cellular telephone call has been placed.

9. A cellular data telephone for communicating data with a data host, said cellular data telephone coupled to the data host by means of a cellular telephone system, a cellular data switch and a landline telephone system, said cellular data switch having a plurality of telephone lines coupled to the cellular telephone system and landline telephone system for switching a cellular telephone call to the landline telephone system, and said cellular data switch maintaining and reswitching a cellular data telephone to a switched telephone line to the landline telephone system until disconnected by the cellular data telephone, said cellular data telephone comprising:

a cellular telephone having a predetermined telephone number for originating and receiving cellular telephone calls on the cellular telephone system;

a cellular modem coupled to the cellular telephone for communicating data therebetween;

a data terminal for transceiving data, said data terminal producing a call origination signal having a first state when a landline telephone call to the data host is originated and a second state when the landline telephone call is disconnected;

data control means coupled between said data terminal and said cellular modem for coupling data therebetween, said data control means including:

buffer means for storing data from the data terminal and producing an output signal when said buffer means is full; and processing means for placing a cellular telephone call to the cellular data switch in response to the first state of the call origination signal, for disconnecting the cellular telephone call when data has not been received from the data terminal for a predetermined time interval, for placing another cellular telephone call to the cellular data switch in response to the buffer means output signal, and for disconnecting the cellular telephone call and the landline telephone call in response to the second state of the call origination signal.

10. The cellular data telephone according to claim 9, wherein said data control means further includes means for encoding an RF disconnect signal when entered data has not been received for the predetermined time interval and coupling said RF disconnect signal to said cellular telephone for transmission.

11. The cellular data telephone according to claim 9, wherein said data control means further includes means for storing the predetermined telephone number of said cellular telephone, said processing means coupling the stored predetermined telephone number to said cellular telephone for transmission when a cellular telephone call has been placed.

12. A method of communicating data between a cellular data telephone and a data host, said cellular data telephone coupled to the data host by means of a cellular telephone system, a cellular data switch and a landline telephone system, said method comprising the steps of:

placing a cellular telephone call to the cellular data switch and a landline telephone call to the data host;

disconnecting the cellular telephone call when data has not been received from the cellular data telephone for a predetermined time interval;

maintaining the landline telephone call;

storing data from the cellular data telephone in buffer means until the buffer means is full; and placing another cellular telephone call to the cellular data switch when the buffer means is full.

13. A method of communicating data between a cellular data telephone and a data host, said cellular data telephone coupled to the data host by means of a cellular telephone system, a cellular data switch and a landline telephone system, said method comprising the steps of:

placing a cellular telephone call to the cellular data switch and a landline telephone call to the data host;

disconnecting the cellular telephone call when data has not been received from the cellular data telephone for a predetermined time interval;

maintaining the landline telephone call;

storing data from the cellular data telephone in first buffer means until the first buffer means is full;

storing data from the data host in second buffer means until the second buffer means is full; and placing another cellular telephone call to the cellular data switch when one of the first and second buffer means is full.

* * * * *